Aug. 25, 1964 N. E. PETERSON ETAL 3,146,438

DECODING SYSTEM

Filed May 23, 1963

| THREE UNIT CODE | | | | |
|---|---|---|---|---|
| DECODED DIGITS | BISTABLE ELEMENT CONDITION | | | TOTAL METER CURRENT |
| | B1 | B2 | B3 | (ma) |
| 0 | 0 | 0 | 0 | 0 |
| 1 | 1 | 0 | 0 | .11 |
| 2 | 0 | 1 | 0 | .22 |
| 3 | 1 | 1 | 0 | .33 |
| 4 | 0 | 0 | 1 | .44 |
| 5 | 1 | 0 | 1 | .55 |
| 6 | 0 | 1 | 1 | .66 |
| 7 | 1 | 1 | 1 | .77 |

INVENTORS
NORMAN E. PETERSON
ERNEST E. COURCHENE, Jr.
BY
Norman N. Holland
ATTORNEY United States Patent Office 3,146,438

Patented Aug. 25, 1964

3,146,438

DECODING SYSTEM

Norman E. Peterson and Ernest E. Courchene, Jr., Norwalk, Conn., assignors to Digitech, Inc., South Norwalk, Conn., a corporation of Connecticut Filed May 23, 1963, Ser. No. 282,775

10 Claims. (Cl. 340—347)

Figures 1, 2:
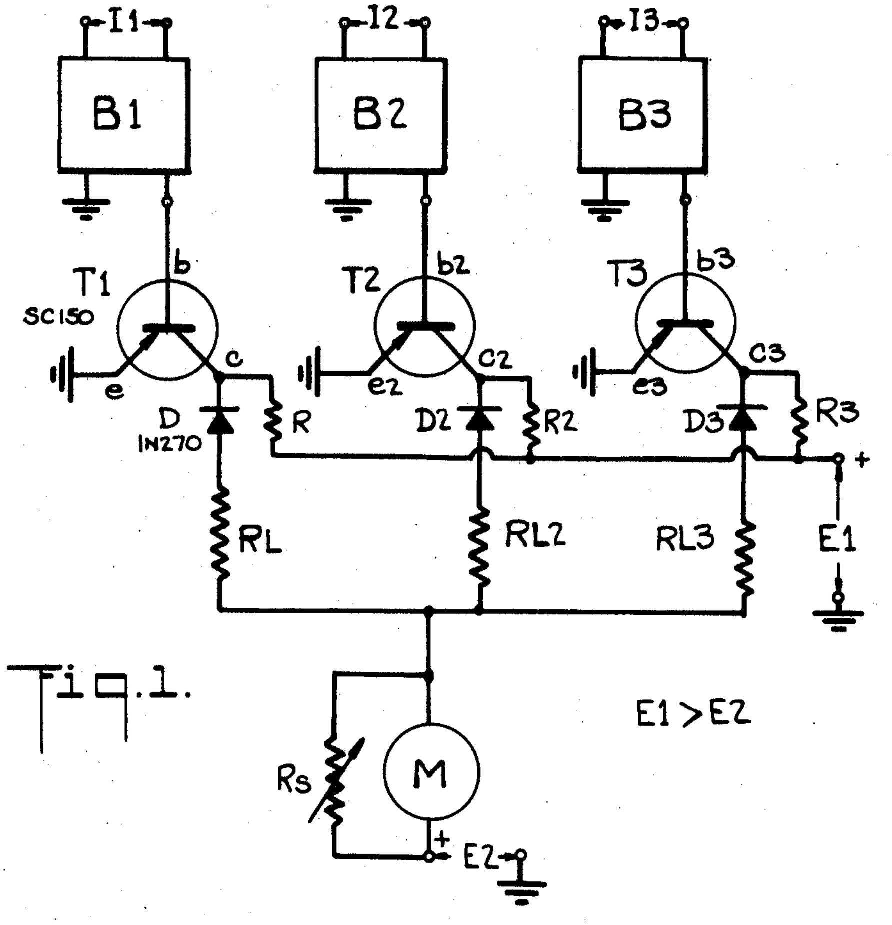

The present invention relates to a data register system and more particularly to a linear decoding system for providing a linear current proportional to a coded data value and independent of changes in the system parameters.

In numerous digital computing operations such as, for example, where a value is recorded on a series of bistable elements using a binary code, a decoding means must be provided for indicating the value of the binary coded number. It is known to decode a binary by generating a current proportional to the binary coded value. Such known decoding or adding systems have been subject to random variations and inaccuracies due to variations in the values of the circuit elements and have also been difficult to adjust due to the need for calibrating each of several separate current paths to the indicator or meter.

Accordingly, an object of the present invention is to provide an improved decoding system.

Another object of the present invention is to provide a stable linear decoding circuit highly immune to circuit parameter variations.

Another object of the present invention is to provide an easily and rapidly calibrated decoding system.

Another object of the present invention is to provide an efficiently damped linear decoding circuit.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a schematic diagram of a preferred embodiment of the decoding system; and FIG. 2 is a chart illustrating a typical binary code for use in the system of FIG. 1.

The system of the present invention is useful in a wide variety of applications where an accurate linear addition of currents is required for indicating the value of a binary coded number or the state of one or more bistable elements. The circuit is particularly useful in decoding a binary coded number as encoded on a series of bistable elements and such a use will be described below to facilitate the explanation.

To further facilitate the description, the decoding circuit will be described in a register system having three flip-flop elements, however, it is clear that other numbers of elements may be used and other two level voltage sources.

To clarify the explanation of the circuit in the embodiment illustrated in FIG. 1, a typical binary encoding of digits showing the position of three bistable elements is illustrated in FIG. 2.

Each of the bistable elements may be conventional flip-flop circuits or other elements providing outputs at two different voltage levels. Thus, the bistable element B1 may be a flip-flop having two different voltage levels normally indicated as 1 for the higher level and 0 for the lower level voltage output. The elements B2 and B3 have similar 1 and 0 levels.

Each of the elements B1, B2 and B3 has its output connected to a separate current generating circuit and in the illustrated embodiment each of the current generating circuits provides zero meter current for the 0 position of the bistable element. For the 1 or high level outputs the current generating circuits provide relative current values of one, two and four for elements B1, B2 and B3 respectfully as will be more fully described below.

The three elements B1, B2 and B3 are set to the various 0 and 1 combinations as illustrated in FIG. 2 to register digits from zero to seven by applying appropriate signals to their inputs I1, I2, and I3 in the usual manner. The linear decoding circuit of the present invention now provides a linear current and meter reading proportional to the digit encoded on the bistable elements B1, B2 and B3 to thereby decode the binary coded number.

FIG. 1 illustrates a preferred embodiment of the decoding circuit for the three bistable elements B1, B2 and B3 which are conventional flip-flop circuits or other systems having a two level voltage output.

The decoding circuit employs a transistor T1 with the transistor emitter *e* grounded and with the output voltage of the bistable element B1 coupled between the base *b* and ground. The transistor T1 collector *c* is coupled to a regulated voltage source E2 through diode D, load resistance RL and an ammeter M. In addition, the collector *c* is connected to a voltage source E1 through resistor R.

The voltage E1 is greater than the regulated voltage E2 so that the diode D blocks current passage through the meter M when the transistor T1 is not conducting i.e. when the bistable element B1 is on its 0 or low voltage condition. Thus the 0 position for the bistable element or flip-flop B1 gives zero meter current.

When the bistable element B1 has been changed to its 1 or high voltage state by a suitable input voltage, the transistor T1 conducts. The output of B1 is preferably set in its 1 condition to cause the transistor to operate in a saturated state. With the grounded emitter connection of the preferred embodiment, the relatively low load impedance of the transistor T1 causes the collector voltage to be at substantially zero or ground potential when T1 is conducting. While a separate transistor is illustrated as coupled between the output of the bistable elements and the decoding resistors, it is clear that the transistor may comprise a portion of the bistable element circuit.

This results in a current through the meter M which is directly controlled by the value of the resistor RL due to the fact that voltage E2 is provided from a closely regulated source and as the resistance in the diode D and the meter M are negligible with respect to the value of resistor RL. By using a precision resistor for RL the variation in meter current may be held within a fraction of a percent since the changes in the value of RL may be controlled to the same extent. It is thus clear that neither variations in the output voltage of the bistable element B1, nor the charasteristics of the transistor T1, nor the voltage E1 will have any significant effect upon the meter current resulting during the high or 1 position of the bistable element B1.

Similar circuits are used to generate similarly controlled precision currents for the 1 position of the bistable elements B2 and B3 so that these currents are likewise controlled by the values chosen for resistors RL2 and RL3.

The values of RL and RL2 and RL3 are chosen to give relative currents as indicated in FIG. 2 i.e. with relative current values of 1, 2 and 4 for elements B1, B2 and B3 respectively. It is now clear that the set-up of the three bistable elements in various combinations of their 0 and 1 positions as illustrated in FIG. 2 will provide additive currents through meter M to give readings on the meter M proportional to the encoded digits between 0 and 7.

For example, with the values of resistors RL, RL2 and RL3 137,000 ohms, 68,100 and 34,000 ohms respectively and with E2 set at 15 volts, a meter current proportional to the digits 0–7 will result which is calculated in accordance with the following example for the digit 3.

*Example for Coded Digit 3*

$$\text{TOTAL RESISTANCE}=\frac{RL\times RL2}{RL+RL2}$$

$$RT=\frac{(137{,}000)\ (68{,}500)}{205{,}500}=455{,}000 \text{ ohms}$$

$$\text{METER CURRENT}=\frac{E}{R}=\frac{15}{455{,}000}=.33 \text{ ma.}$$

The meter reading is calibrated by the adjustable shunt resistor $R_s$ and it is clear that the meter M may be calibrated for any number of branches by an adjustment in any one branch since the relative values of the current are independent of all circuit parameters except for the values chosen for the load resistors RL, RL2 and RL3.

It will be seen that an improved decoding system is provided which gives a linear addition of currents providing a total current indication proportional to a coded number and wherein the system providing for the addition is substantially independent of variations resulting from changes in the circuit parameters. Values of the currents are affected only by resistance and voltage values and variations in the resistance values are limited by using precision resistors and a single highly regulated voltage source is used for any number of individual current paths. The improved decoding circuit is also calibrated in a single operation as an adjustment for one current path calibrates the entire circuit. The circuit is also relatively simple and capable of being used in compact convenient form in a wide variety of systems where such a linear addition of currents is required.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A decoding system for converting binary coded information represented by a two level voltage output to a predetermined current comprising the combination of a transistor having an emitter and a collector and a base, said emitter being grounded, a current indicator, one side of said indicator adapted for being coupled to a voltage source, means connecting the other side of said indicator to the collector for permitting current flow through the indicator only when the collector voltage is lower than the voltage source, and said means including a resistor for controlling the indicator current.

2. A decoding system for converting binary coded information represented by a two level voltage output to a predetermined current comprising the combination of a plurality of transistors each having an emitter and a collector and a base, said emitters being grounded, a current indicator, a reference voltage connected to one side of said indicator, separate means connecting the other side of said indicator to each of the collectors to permit current flow through each of said means only when the collector voltage for that means is lower than the reference voltage, and each of said means including a resistor.

3. A register system comprising the combination of a plurality of transistors each having an emitter and a collector and a base, a bistable element having a two level voltage output coupled to each base, said emitters being grounded, a current indicator, a first voltage source connected to one side of said indicator, separate means connecting the other side of said indicator to each of the collectors to permit current flow through each of said means only when the collector voltage for that means is lower than the reference voltage, each of said means including a resistor, a second voltage source connected to each of said collectors, and a resistor in each connection between the second voltage source and the collectors.

4. The system as claimed in claim 3 in which each of said means includes a semiconductor diode.

5. A decoding system for converting binary coded information represented by a two level voltage output to a predetermined current comprising the combination of a transistor having an emitter and a base and a collector, said emitter being grounded, a rectifier and a resistor and a current indicator connected serially between the collector and a first voltage source, said base adapted for connection to the two level voltage output, a second voltage source connected to said collector through another resistor, and said first voltage source being lower than said second voltage source to place a reverse bias on said rectifier for cutting off indicator current when said transistor is cut off.

6. A linear decoding system comprising the combination of a plurality of transistors each having an emitter and a base and a collector, said emitters being grounded, a current indicator having one side coupled to a first voltage source and its opposite side coupled to each collector through a separate coupling comprising a serially connected rectifier and resistor, a second voltage source connected to each collector through a separate resistor, said first voltage being lower than said second voltage, and said rectifiers being coupled to prevent current flow through said indicator when the collector voltage is above the voltage of said first voltage source.

7. The system as claimed in claim 6 in which said rectifiers comprise semiconductor diodes.

8. A register system comprising the combination of a plurality of transistors each having an emitter and a base and a collector, said emitters being grounded, bistable voltage sources coupled to each of said bases for selectively switching said transistors from a cut off condition to a conducting condition, a current indicator having one side coupled to a first voltage source and its opposite side coupled to each collector through a separate coupling comprising a serially connected rectifier and resistor, a second voltage source connected to each collector through a separate resistor, said first voltage being lower than said second voltage, and said rectifiers being arranged to prevent current flow through said indicator when said collector voltage is above the voltage of said first voltage source.

9. A register system comprising the combination of a plurality of transistors each having an emitter and a base and a collector, said emitters being grounded, bistable voltage sources coupled to each of said bases, a current indicator having one side coupled to a first positive voltage source and its opposite side coupled to each collector through a separate coupling comprising a serially connected rectifier and resistor, a second positive voltage source connected to each collector through a separate resistor, said first voltage being lower than said second voltage, and said rectifiers being coupled to prevent current flow through said indicator when said collector voltage is above the voltage of said constant voltage source.

10. The system as claimed in claim 9 in which said rectifiers comprise semiconductor diodes.

References Cited in the file of this patent

UNITED STATES PATENTS 2,956,272 Cohler et al. ------------ Oct. 11, 1960